June 8, 1971  T. J. ALEXANDRIS  3,584,092

METHOD AND APPARATUS FOR MOLDING THREADED ARTICLES

Filed April 30, 1969

INVENTOR.
T. J. ALEXANDRIS

BY *Young & Quigg*

ATTORNEYS

United States Patent Office

3,584,092
Patented June 8, 1971

3,584,092
METHOD AND APPARATUS FOR MOLDING THREADED ARTICLES
Thomas J. Alexandris, Kansas City, Mo., assignor to Phillips Petroleum Company
Filed Apr. 30, 1969, Ser. No. 820,586
Int. Cl. B29c *17/04;* B29d *1/00*
U.S. Cl. 264—92
8 Claims

ABSTRACT OF THE DISCLOSURE

A method and apparatus for molding threaded articles. The apparatus is composed of a female mold, a rotatable sleeve, and means for rotating the sleeve. The female mold has side walls forming a mold cavity and has a longitudinal helical slot through the walls. The sleeve has a chamber formed by chamber walls and has a longitudinal helical deformation which is aligned in register with the slot in the female mold. The sleeve can be rotated such that the deformation thereon extends laterally through the slot in the female mold. The apparatus can also include a heating means for heating a sheet of plastic material and means for forcing the sheet into the mold cavity.

Figure 1:
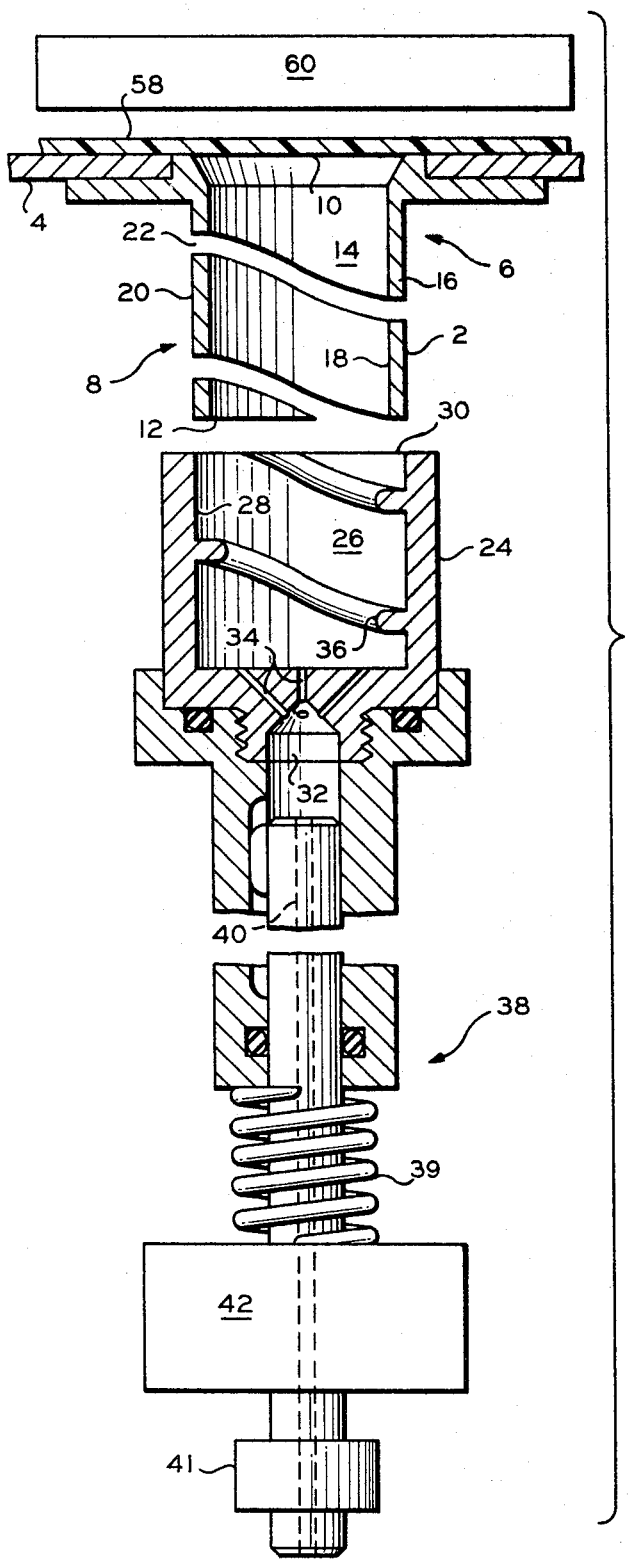

In the method, the sleeve is rotated until the deformation thereon is positioned within the slot in the mold cavity. A sheet of heated material is then drawn into the mold cavity and over the deformation extending thereinto. The sheet is then cooled, the deformation rotated out of the slot and away from the formed article, and the article is removed from the mold cavity.

---

This invention relates to a method and apparatus for molding threaded articles. Another aspect of this invention relates to a method and apparatus for facilitating removal of a threaded plastic article from its mold.

In the past, molding of threaded plastic articles has posed the problem of removing the molded object from the mold. In heretofore mold removal methods where the threaded article is physically pulled or (stripped) from the mold, deformation or destruction of the molded threads often occurs as said article is forced from the mold. In other methods where the mold is removed by rotating the mold relative to the threaded article, frictional forces between the article and the mold are often so large that the threaded article is seriously damaged or destroyed. Damage of the product during mold removal not only causes a waste of material, but also often results in labor expenditures to rid the mold of the damaged particle and place the apparatus back in operation. In addition, attempts to remove broken articles from the mold sometimes often result in scoring and damaging the surface of the mold cavity.

It is an object of this invention to provide an improved apparatus and method for molding threaded articles. Another object is to provide an apparatus for facilitating removal of a threaded plastic article from its mold. Yet another object is to provide an apparatus and method for removing a threaded plastic article from its mold wherein reduced forces are subjected upon the threaded article. A still further object is to provide an apparatus and method for molding threaded articles having dimensions of improved tolerance and improved appearance. Other aspects, objects, and advantages of the present invention will become apparent from a study of the disclosure, the appended claims, and the drawing.

Figure 2:
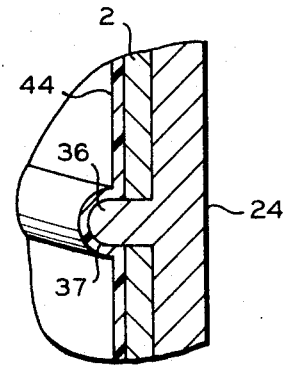
Figure 3:
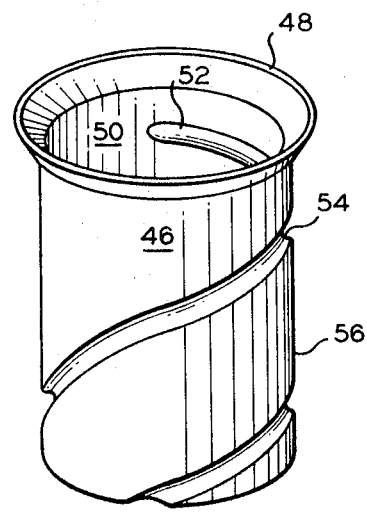

In the drawing, FIG. 1 is a partial sectional view of the apparatus of this invention with the sleeve in the second position. FIG. 2 is a sectional view of a portion of the female mold and the sleeve of this invention in its first position. FIG. 3 is a prospective view of a threaded article molded with the method and apparatus of this invention.

Referring to FIG. 1, female mold 2 is held by supporting plate 4. The female mold 2 is generally cylindrical in shape and has a longitudinal axis, upper and lower portions 6, 8, upper and lower ends 10, 12, a longitudinally extending mold cavity 14, side walls 16, and an inner and outer surface 18, 20. A longitudinally extending helical slot 22 is formed through the side walls 16 of the female mold 2. The slot 22 opens on the lower end 12 of the female mold 2 and extends around the female mold, preferably in a clockwise direction when viewed from said lower end. The slot 22 terminates on the lower end portion 6 at a distance removed from the upper end 10 of the female mold 2. The inner surface 18 of the side walls 16 of the upper end portion 6 of the female mold 2 extends outwardly from the longitudinal axis. The female mold is preferably made of metal, preferably aluminum or steel, however, plastic materials such as epoxies, or other like material, are used in the plastics art for forming molds.

A sleeve 24 which is coaxial with the female mold 2 has a chamber 26, an inner surface 28, upper and lower ends 30, 32, and an air channel 34 through the lower end 32 and in communication with the channel 26. The channel 26 has a diameter larger than the diameter of the outer surface 20 of the female mold 2 and is constructed to receive a portion of said female mold. A longitudinally extending helical deformation 36, such as a guide or ridge, is formed on the inner surface 28 of the sleeve 24. The pitch and lead of the deformation 36 is identical to that of the helical slot of the female mold 2. The deformation 36 extends laterally from the inner surface 28 of the sleeve 24 a distance greater than the thickness of the side walls 16 of the female mold 2, and preferably extends laterally within the mold cavity 14 of the female mold 2 a distance in the range of $\frac{1}{100}$ to $\frac{1}{3}$ times the diameter of said mold cavity. The deformations 36 preferably have a smooth rounded side portion 37 for forming the threads of the article. One end of the deformation 36 terminates at the upper end 30 of the sleeve 24 and is constructed to engage the slot 22 of the female mold 2 over the entire length of said slot and form a closed mold cavity.

A sleeve actuator 38 is connected to the lower end 32 of the sleeve 24 for rotating the sleeve about its longitudinal axis in clockwise and counterclockwise directions and longitudinally moving the sleeve between a first position wherein the deformation 36 of the sleeve is engaged in the slot over the entire length of said slot and a second position wherein the sleeve is removed from contact with the female mold 2. An air channel 40 extends longitudinally through the sleeve actuator 38 for the passage of air from the mold cavity through said sleeve actuator. A conventional power source 42 is connected to the sleeve actuator 38 for aligning, rotating, and longitudinally moving the actuator and the sleeve 24 relative to the female mold 2. A conventional vacuum pump (not shown) may be connected to air channel 40 through rotating joint 41 for drawing air from the mold cavity. A heating means 60 is provided to heat the plastic sheet 58 from which the threaded article 46 (FIG. 3) is formed.

FIG. 2 shows a portion of the deformation 36 of the sleeve 24 extending through the slot of the female mold 2 in closed engagement. Molten plastic 44 has been forced by a pressure differential into the mold cavity and into forcible contact with the inner surface of the mold for coating the mold cavity and forming the threaded article.

FIG. 3 shows a threaded article 46, here shown as a screw cap, formed by the method and apparatus of this invention. Flair lip 48 of the threaded article 46 is formed by the outwardly extending upper end portion 6 of the female mold 2. It should be noted that the threaded article 46 has a longitudinal chamber 50 and inwardly extending helical ridge 52 on the surface of said chamber and a corresponding helical groove 54 on the outer surface 56 of the molded article 46. Owing to this construction, the threaded article can be used as either an internal or an external screw cap.

In the operation of the apparatus of this invention, the sleeve actuator 38 is moved by the spring 39, power source 42 and the sleeve 24 is aligned and rotated preferably in a clockwise direction to longitudinally move the sleeve upwardly over the female mold 2 and move the deformation 36 of the sleeve through and along the slot 22 from the second to the first position of said sleeve to form a sealed mold cavity.

The formed thermoplastic sheet 58 can be made from one or more of the following polymers: vinyl polymers and copolymers; polystyrene and polystyrene containing polymers; fluorocarbons such as polytetrafluoroethylene and polychlorotrifluoroethylene, polycarbonate resin; polyethylene and copolymers of ethylene and butenes; polymers and copolymers of propylene; polyamide; and chlorinated polyether. It is heated by a radiant electrical heater, a forced air heater, or by submersion in a heated fluid to a temperature near its melt point and thereafter is placed in contact with the upper end 30 of the sleeve 24 covering the upper end of the mold cavity. The sheet can be alternately placed into contact with the upper end 30 and heated to forming temperature. Air is then drawn through the sleeve air channel 34 and the channel 40 of the sleeve actuator 38 by conventional suction means to create a partial vacuum within the mold cavity. Atmospheric pressure then forces the molten plastic 44 into forcible contact with the surface of the mold cavity. The partial vacuum is thereafter maintained while the formed article is cooled to a rigid or semi-rigid condition. Alternately, a superatmospheric pressure may be imposed on the sheet from above and the air channels 34 and 40 left open to the atmosphere, thereby forcing the softened plastic into contact with the mold walls. Cooling of the article can be by conduction.

After the formed article has cooled to a temperature at which the plastic material is semi-rigid and cannot be objectionably deformed by the extraction process of this invention, the pressure differential is removed and the power source 42 moves the actuator 38 and rotates the sleeve 24 in a direction opposed to the direction required to form a closed mold cavity, preferably a counterclockwise direction. Movement of the deformation 36 of the sleeve 24 relative to the threaded article 46 imparts small forces to the molded article because the total area of the deformation 36 moving in contact with the threaded article represents a small percentage of the total external area of said article. In sliding contact, the frictional forces created are directly proportional to the area of the contacting surfaces. By providing a reduced contacting area relative to the contacting area of previously utilized molds during separation from their threaded article 46, the frictional force exerted on the threaded article is reduced. Since less force is exerted on the threaded article 46 during mold separation by the method and apparatus of this invention, the occurrence of product deformation or destruction is substantially reduced.

The sleeve 24 is thereafter rotated and removed from contact with the threaded article 46 and said article is extracted from the female mold 2 by conventional methods.

By using the apparatus and method of this invention the separate the article from the mold, said article can be cooled to a condition of greater rigidity than heretofore practical before extracting said article from the mold. This increased cooling results in the dimensons of the extracted product being of improved tolerance and the article being of improved appearance. When an article having a high temperature is separated from the mold, uncontrolled shrinkage and deformation often occurs.

In a specific example, a mold similar to that shown in the drawings is constructed of aluminum having a smooth continuous rounded single thread $\frac{1}{3}$ inch in width with a pitch and lead of $\frac{1}{2}$ inch and extending inward $\frac{1}{7}$ of the diameter of the mold. The mold is $\frac{7}{8}$ inch in diameter by 1 inch deep with the thread extending from the closed end to within $\frac{1}{4}$ inch of the open end. The last $\frac{1}{4}$ inch is flared outwardly at a 45° angle to the axis of the mold. The vent passage 34 is $\frac{1}{32}$ inch in diameter and also 6 additional $\frac{1}{32}$ inch vent passages are placed circumferentially or equidistant around the lower corner of member 24 to preclude air entrapment in this area. Member 2 has $\frac{1}{16}$ inch thick walls and member 24 has $\frac{1}{8}$ inch thick walls.

A 50-mil thick polypropylene sheet 2 inches in diameter is heated to 330° F. and placed over the end 10 of the mold. It is clamped against supporting plate 4 by a cup shaped air dome into which air is admitted at a pressure of 90 p.s.i. to force the sheet into the mold. After five seconds, the pressure is reduced to 10 p.s.i., sleeve 24 is unscrewed, the dome is unclamped and removed and the molded screw cap lifted out of the mold 2. The flange is trimmed from the cap $\frac{1}{8}$ inch from the undersurface of the flange leaving a cap with an overall height of $\frac{7}{8}$ inch. A $\frac{1}{16}$ inch thick by $\frac{7}{8}$ inch in diameter cork disc is forced into position in the end of the cap and the cap is screwed onto a 10 ounce blow molded polypropylene bottle filled with water at room temperature and having an opening with a matching male thread. The bottle was dropped on its top from a height of 4 feet and no leaks in or around the cap occurred. The formed cap was considered mechanically adequate, decorative, and of superior quality.

Various modifications and alterations of this invention will become apparent to those skilled in the art from the foregoing discussion, example, and accompanying drawings, and it should be understood that this invention is not to be unduly limited thereto.

That which is claimed is:

1. An apparatus for molding a threaded article, comprising:
   a female mold having side walls forming a mold cavity and having a longitudinal helical slot through said walls;
   a rotatable sleeve which has a chamber formed by chamber walls and has a longitudinal helical deformation on the chamber walls which is aligned in register with the helical slot through the walls of the mold cavity, said sleeve being rotatably movable from a first position at which the deformation extends laterally through the slot to a second position at which the deformation is removed from the slot; and
   means for rotating the sleeve between the first and second positions of the sleeve.

2. An apparatus, as set forth in claim 1, further including means for suplying softened plastic to the mold cavity comprising:
   heating means for heating a thermoplastic sheet and means for creating a pressure differential, for expanding the heated sheet into contact with the mold cavity and the deformation of the sleeve.

3. An apparatus, as set forth in claim 1, wherein the deformation of the sleeve at the first position is in sealable contact with the entire slot of the female mold.

4. An apparatus, as set forth in claim 1, wherein the deformation of the sleeve extends laterally into the mold cavity at the sleeve's first position a distance in the range of $\frac{1}{100}$ to $\frac{1}{3}$ times the diameter of the mold cavity.

5. An apparatus, as set forth in claim 1, wherein the portion of the deformation of the sleeve extending into the mold cavity at the first position of the sleeve has a smooth rounded surface.

6. A method of molding a threaded article in a separable mold zone, comprising:
   aligning an internal helical protrusion of a sleeve in register with a helical slot of a female mold;

rotating the sleeve in one direction about the female mold until the helical protrusion enters and fills the helical groove and forms a sealed mold cavity;

drawing molten plastic into forcible contact with the surface of the sealed mold cavity to form a threaded article;

cooling the threaded article;

rotating the sleeve in another direction about the female mold to move the helical protrusion of the sleeve along and from the threads of the threaded article; and extracting the threaded article from the female mold.

7. A method, as set forth in claim 6, wherein the molten plastic is drawn into the mold cavity by creating a partial vacuum within the mold cavity.

8. A method, as set forth in claim 6, wherein the sleeve is rotated in a clockwise direction to form a sealed mold cavity and thereafter rotated in a counterclockwise direction to separate the sleeve from the female mold and the threaded article.

References Cited

UNITED STATES PATENTS

| | | | |
|---|---|---|---|
| 3,150,222 | 9/1964 | Blaustein et al. | 264—318 |
| 3,247,548 | 4/1966 | Fields et al. | 264—318X |

ROBERT F. WHITE, Primary Examiner

J. H. SILBAUGH, Assistant Examiner

U.S. Cl. X.R.

18—2, 19; 249—59; 264—93, 318, 334